United States Patent
Chimangala Seetharamrao et al.

(10) Patent No.: US 10,344,357 B1
(45) Date of Patent: Jul. 9, 2019

(54) TURBINE WHEEL INCORPORTATING NICKEL-BASED ALLOY

(71) Applicant: Garrett Transportation I Inc., Torrance, CA (US)

(72) Inventors: Prashanth Chimangala Seetharamrao, Karnataka (IN); Marc Wilson, Deyvillers (FR); Veronika Ricankova, Brno (CZ); Michael John Morrissey, Kilkenny (IE)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 16/136,597

(22) Filed: Sep. 20, 2018

(51) Int. Cl.
*C22C 19/05* (2006.01)
*F01D 5/28* (2006.01)

(52) U.S. Cl.
CPC ............... *C22C 19/057* (2013.01); *F01D 5/28* (2013.01); *C22C 2202/00* (2013.01); *F05D 2220/40* (2013.01); *F05D 2240/24* (2013.01); *F05D 2300/17* (2013.01); *F05D 2300/5023* (2013.01); *F05D 2300/518* (2013.01); *F05D 2300/608* (2013.01)

(58) Field of Classification Search
CPC ................................ C22C 19/057; C22F 1/10
See application file for complete search history.

(56) References Cited

U.S. PATENT DOCUMENTS 4,895,201 A * 1/1990 DeCrescente ........... C22C 19/03
164/122.1

* cited by examiner

*Primary Examiner* — Jessee R Roe
(74) *Attorney, Agent, or Firm* — Lorenz & Kopf, LLP (57) ABSTRACT

Turbocharger turbine wheels including nickel-based alloys are disclosed herein. In one exemplary embodiment, a turbocharger turbine wheel includes as, at least part of its constituency, a nickel-based alloy that includes, on a weight basis of the overall alloy: about 10.5% to about 11.5% cobalt, about 9.0% to about 10.0% chromium, about 5.75% to about 6.25% aluminum, about 2.8% to about 3.3% tantalum, about 4.0% to about 4.5% molybdenum, about 2.2% to about 2.4% titanium, about 0.13% to about 0.15% carbon, about 0.03 to about 0.09% zirconium, and a majority of nickel. The nickel-based alloy excludes tungsten except in unavoidable trace amounts. The turbocharger turbine wheel may be configured for operating at about 980° C. to about 1020° C.

18 Claims, 7 Drawing Sheets

TURBINE WHEEL INCORPORTATING NICKEL-BASED ALLOY

TECHNICAL FIELD

The present disclosure is generally directed to metal alloys with improved high-temperature oxidation and fatigue resistance for use in turbocharger applications. More particularly, the present disclosure is directed to nickel-based alloys and turbine wheels including nickel-based alloys.

BACKGROUND

The turbine wheel, usually a cast nickel-based alloy, used in turbocharger is a high-speed rotating component that is exposed to high temperature combustion gasses between temperatures of about 980° C. to about 1020° C., depending upon the application. To withstand such a high temperature, the nickel-based alloy material should be oxidation resistant as well as dwell-fatigue resistant while rotating in the approximately 200,000-300,000 RPM range. Existing alloys for such applications all have various deficiencies: For example, the Mar-M-246 nickel-based alloy is relatively expensive, whereas the IN-713C nickel-based alloy exhibits inferior high-temperature properties.

Therefore, it will become apparent to those skilled in the art that there remains a present and continuing need for the provision of improved nickel-based alloys and turbine wheels included such nickel-based alloys. Particularly, it would be desirable to provide an alloy based on Mar-M-246 but with an improved chemistry that reduces costs significantly while still retaining the desirable high-temperature oxidation and dwell-fatigue resistance of Mar-M-246. Furthermore, other desirable features and characteristics of the inventive subject matter will become apparent from the subsequent detailed description of the inventive subject matter and the appended claims, taken in conjunction with the accompanying drawings and this background of the disclosure.

BRIEF SUMMARY

Nickel-based alloys and turbocharger turbine wheels including nickel-based alloys are disclosed herein. In one exemplary embodiment, a nickel-based alloy includes or consists of, on a weight basis of the overall alloy: about 10.5% to about 11.5% cobalt, about 9.0% to about 10.0% chromium, about 5.75% to about 6.25% aluminum, about 2.8% to about 3.3% tantalum, about 4.0% to about 4.5% molybdenum, about 2.2% to about 2.4% titanium, about 0.13% to about 0.15% carbon, about 0.03 to about 0.09% zirconium, and a majority of nickel, with the understanding that there may be inevitable/unavoidable impurities. The nickel-based alloy excludes tungsten except in unavoidable trace amounts. Additionally, in some examples, the nickel-based alloy may include or further consist of silicon in an amount of less than about 0.2%, boron in an amount of less than about 0.02%, manganese in an amount of less than about 0.2%, and sulfur in an amount of less than about 0.015%.

With regard to the foregoing alloy embodiments: the amount of cobalt may be limited to about 10.7% to about 11.3%; alternatively or additionally, the amount of chromium may be limited to about 9.2% to about 9.8%; alternatively or additionally, the amount of aluminum may be limited to about 5.9% to about 6.1%; alternatively or additionally, the amount of tantalum may be limited to about 2.9% to about 3.2%; alternatively or additionally, the amount of molybdenum may be limited to about 4.1% to about 4.4%; alternatively or additionally, the amount of titanium may be limited to about 2.25% to about 2.35%.

In another exemplary embodiment, a turbocharger turbine wheel includes or consists of, at least as a part of its overall composition, a nickel-based alloy, wherein the nickel-based alloy includes or consists of, on a weight basis of the overall alloy: about 10.5% to about 11.5% cobalt, about 9.0% to about 10.0% chromium, about 5.75% to about 6.25% aluminum, about 2.8% to about 3.3% tantalum, about 4.0% to about 4.5% molybdenum, about 2.2% to about 2.4% titanium, about 0.13% to about 0.15% carbon, about 0.03 to about 0.09% zirconium, and a majority of nickel, with the understanding that there may be inevitable/unavoidable impurities in trace amounts, as is generally appreciated in the art. The nickel-based alloy excludes tungsten except in unavoidable trace amounts. Additionally, in some examples, the nickel-based alloy may include or further consist of silicon in an amount of less than about 0.2%, boron in an amount of less than about 0.02%, manganese in an amount of less than about 0.2%, and sulfur in an amount of less than about 0.015%. Such a turbine wheel may find application for operating at temperatures of 980° C. (constant) and 1020° C. (peak).

With regard to the foregoing turbine wheel embodiments: the amount of cobalt may be limited to about 10.7% to about 11.3%; alternatively or additionally, the amount of chromium may be limited to about 9.2% to about 9.8%; alternatively or additionally, the amount of aluminum may be limited to about 5.9% to about 6.1%; alternatively or additionally, the amount of tantalum may be limited to about 2.9% to about 3.2%; alternatively or additionally, the amount of molybdenum may be limited to about 4.1% to about 4.4%; alternatively or additionally, the amount of titanium may be limited to about 2.25% to about 2.35%.

In a particular embodiment, a nickel-based alloy consists of, on a weight basis of the overall alloy: about 10.7% to about 11.3% cobalt, about 9.2% to about 9.8% chromium, about 5.9% to about 6.1% aluminum, about 2.9% to about 3.2% tantalum, about 4.1% to about 4.4% molybdenum, about 2.25% to about 2.35% titanium, about 0.13% to about 0.15% carbon, about 0.03 to about 0.09% zirconium, silicon in an amount of less than about 0.2%, boron in an amount of less than about 0.02%, manganese in an amount of less than about 0.2%, sulfur in an amount of less than about 0.015%, and a balance of nickel, with the understanding that there may be inevitable/unavoidable impurities, as is known in the art. This alloy may be used in making a turbocharger turbine wheel. Such a turbine wheel may find application for operating at temperatures of 980° C. (constant) and 1020° C. (peak).

This brief summary is provided to introduce a selection of concepts in a simplified form that are further described below in the detailed description and the Figures. This summary is not intended to identify key features or essential features of the claimed subject matter, nor is it intended to be used as an aid in determining the scope of the claimed subject matter.

BRIEF DESCRIPTION OF THE FIGURES

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Unless specifically stated or obvious from context, as used herein, the term "about" is understood as within a range of normal tolerance in the art, for example within 2 standard deviations of the mean. "About" can be understood as within 10%, 5%, 1%, 0.5%, 0.1%, 0.05%, or 0.01% of the stated value. "About" can alternatively be understood as implying the exact value stated. Unless otherwise clear from the context, all numerical values provided herein are modified by the term "about."

Embodiments of the present disclosure provide an improved nickel-based alloy and turbocharger turbine housings made with this nickel-based alloy. The disclosed embodiments detail an improved nickel-based alloy chemistry that is less expensive than Mar-M-246 yet has better high-temperature properties as compared with IN-713C.

The composition of an exemplary nickel-based alloy is now provided below with respect to its constituent elements (all percentages being provided on a weight basis of the overall alloy composition, unless otherwise noted). In one embodiment, elements that are associated with grain boundary cracking and embrittlement should be minimized. For example, in this embodiment, the content of silicon (Si) is maintained below or equal to about 0.2%. The content of phosphorous (P) is maintained below or equal to about 0.015%. Further, the content of sulfur (S) is maintained below or equal to about 0.015%. As an additional matter, to reduce cracking, the master heat alloy that is used to process the alloy to ingot form desirably does not contain any casting revert or scrap having detrimental tramp or trace elements.

Elements that are associated with grain boundary strengthening, including carbon (C), boron (B), and zirconium (Zr) are melting point depressants. Grain boundary liquation during welding of alloys is linked to carbides and borides. Since C (but not B) achieves a "carbon boil" during master alloy refining, embodiments of the nickel-based alloy retain some carbon, likely in the form of carbides (as described below) but not a significant content of borides. Accordingly, the content of B is maintained in a range of about 0.01% to about 0.02%, the content of carbon is maintained in a range of about 0.13% to about 0.15%, and the content of zirconium is maintained in a range of about 0.03% to about 0.09%.

With the aforementioned relatively lower C and B content, the undesirable formation of topologically close-packed (TCP) brittle phases requires concomitant lowering of the minimum amounts of several refractory elements known to form TCP phases. For example, chromium (Cr), molybdenum (Mo), cobalt (Co), and tungsten (W) can combine to form TCP phases. Of these, reducing the Cr lower limit is desirably avoided because Cr plays a role in oxidation/sulfidation resistance. Accordingly, in one embodiment, the content of Cr is from 9.0% to about 10.0%. In another embodiment, the content of Cr is from about 9.2% to about 9.8%.

Co is a solid solution strengthening element, but it can contribute to TCP phase formation. Accordingly, permitting a lower Co content has been discovered to be beneficial. Thus, in one embodiment, the content of Co is from about 10.5% to about 11.5%. In another embodiment, the content of Co is from about 10.7% to about 11.3%.

Furthermore, W is known to be an element that forms carbides, that acts as a solid solution strengthening element, and that forms TCP phases. W is also a relatively expensive element. Accordingly, in order to achieve significant cost reductions as compared with Mar-M-246, W is desirably excluded from the alloy to the greatest extent possible, and may only be present in unavoidable trace/impurity amounts.

Titanium (Ti) is both a carbide and gamma-prime phase forming element. The gamma-prime phase is favorable for high-temperature oxidation resistance. Accordingly, in some embodiments, titanium is provided in a range of about 2.2% to about 2.4%. In other embodiments, titanium is provided in a range of about 2.25% to about 2.35%.

Mo is a solid solution strengthening element and increases the Al partitioning to the gamma-prime phase, but there is evidence in the art that Mo may be detrimental to hot corrosion or oxidation resistance. Mo oxide volatility may also be a negative factor. Accordingly, the content of Mo is desirably maintained within a range of about 4.0% to about 4.5%. In another embodiment, the content of Mo is maintained with a range of about 4.1% to about 4.4%.

Continuing with the description of an exemplary embodiment of the nickel-based alloy, tantalum (Ta) is known to be an element that forms carbides and a solid solution strengthening element that also partitions to the gamma-prime phase. Allowing a higher content of Ta will favor Ta-rich carbides and make up for the absence of Ti in the gamma-prime phase while contributing to solid solution strengthening. Accordingly, in an embodiment, the content of Ta is from about 2.8% to about 3.3%. In another embodiment, the content of Ta is from about 2.9% to about 3.2%.

Al, as a gamma-prime phase forming element, is also included in the alloy composition of the present disclosure. In one embodiment, the content of Al is from about 5.75% to about 6.25%. In another embodiment, the content of Al is from about 5.9% to about 6.1%

Moreover, as the described alloys are nickel-based, it will be appreciated that nickel (Ni) forms a majority of the content (i.e., greater than about 50%) of the described alloy. That is, nickel typically accounts for the balance of the content not otherwise described above, while accounting for inevitable/unavoidable impurities not otherwise set forth above as are commonly understood in the art.

Table 1, set forth below, provides the elemental content of a nickel-based alloy of the present disclosure in accordance with the description provided above, while also specifying the maximum content of additional detrimental tramp or trace elements commonly encountered in nickel-based alloys. Each weight percentage included in Table 1 is understood to be preceded by the term "about." In addition, a minimum of zero means "low as possible", not to exceed the maximum. It should be acknowledged that trace amounts of inevitable/unavoidable impurities may be present (in trace amounts), although not explicitly listed in Table 1, as is known in the art.

TABLE 1

| Application Temperature (C) | 980° C.- 1020° C. |
|---|---|
| Chemical Element | % |
| Carbon, C | 0.13-0.15 |
| Manganese, Mn | <0.2 |
| Sulfur, S | <0.015 |
| Silicon, Si | <0.2 |
| Chromium, Cr | 9.00-10.00 |
| Molybdenum, Mo | 4.00-4.50 |
| Tantalum, Ta | 2.80-3.30 |
| Titanium, Ti | 2.20-2.40 |
| Boron, B | 0.01-0.02 |
| Aluminum, Al | 5.75-6.25 |
| Zirconium, Zr | 0.03-0.09 |
| Cobalt, Co | 10.5-11.5 |
| Nickel, Ni | Balance |

ILLUSTRATIVE EXAMPLE

The present disclosure is now illustrated by the following non-limiting example. It should be noted that various changes and modifications may be applied to the following example and process without departing from the scope of this invention, which is defined in the appended claims. Therefore, it should be noted that the following example should be interpreted as illustrative only and not limiting in any sense.

Using the materials simulation software JMatPro® (available from Sente Software Ltd.), an example alloy composition within the scope of the present disclosure was analyzed for its phase constituency and material properties, in comparison with the previously-known Mar-M-246 and IN-713C materials. In particular, the analyzed alloy ("Alloy-4") had the formula: 6.0% Al, 11.0% Co, 9.5% Cr, 0.14% C, 0.1% Mn, 4.25% Mo, 0.1% Si, 3.05% Ta, 2.3% Ti, 0.06% Zr, 0.015% S, balance Ni and impurities. The exact formulations of the prior art alloys are included on their respective graphs.

Figure 1A:
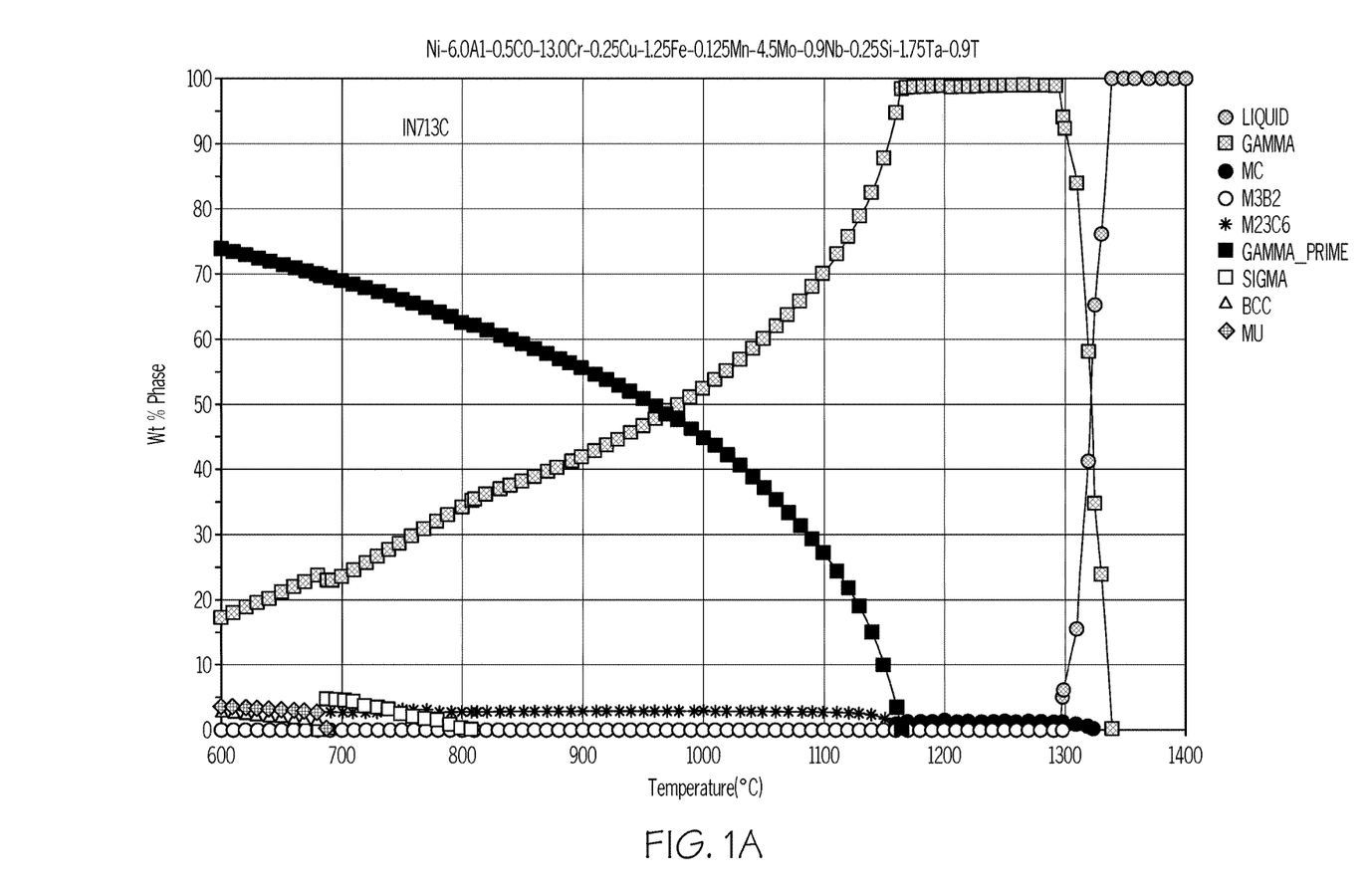
FIGS. 1A, 1B, and 1C are graphs that compare the material phases of the alloys (A) IN-713C, (B) Mar-M-246, and (C) the alloy of the present disclosure, respectively.
Figure 1B:
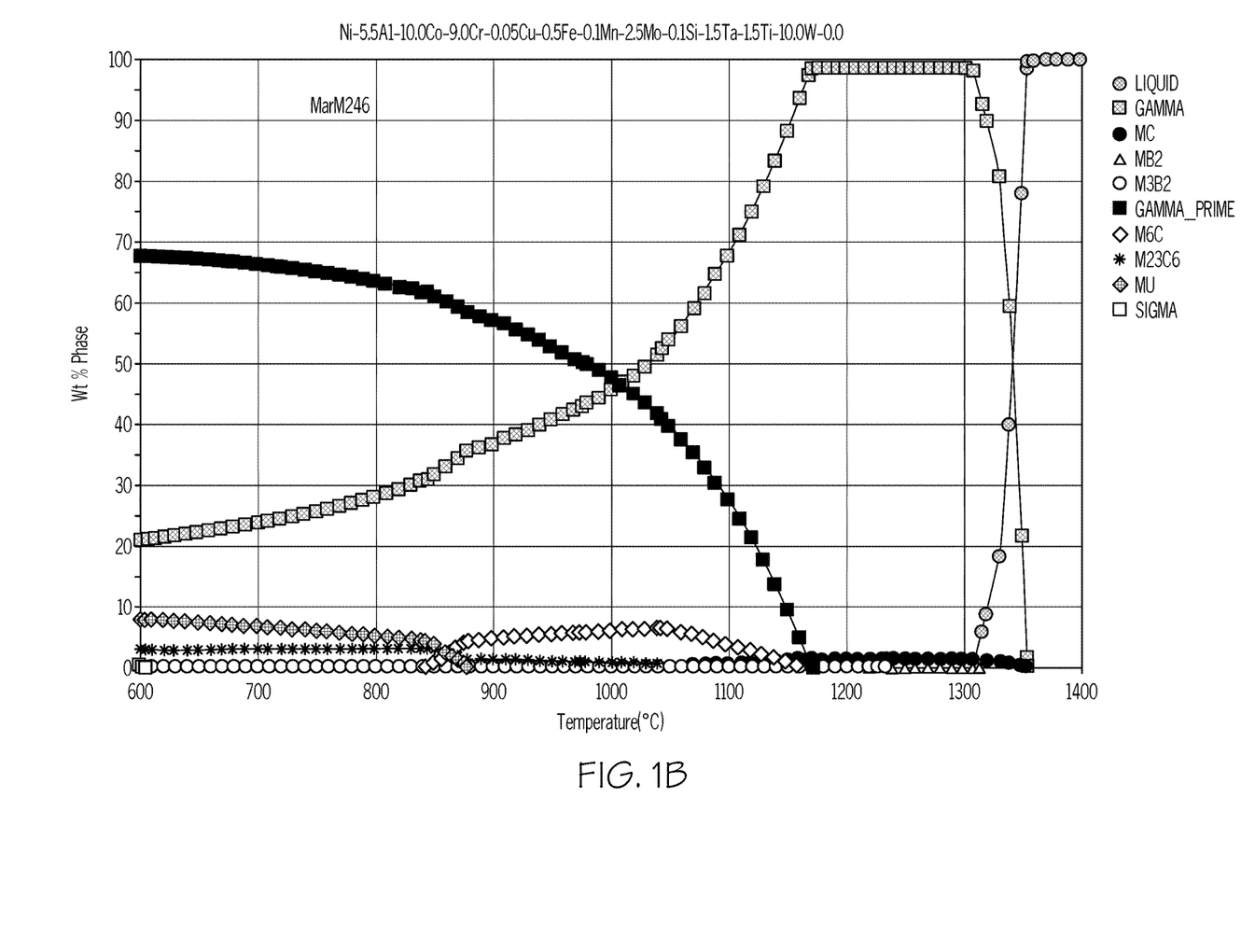
Figure 1C:
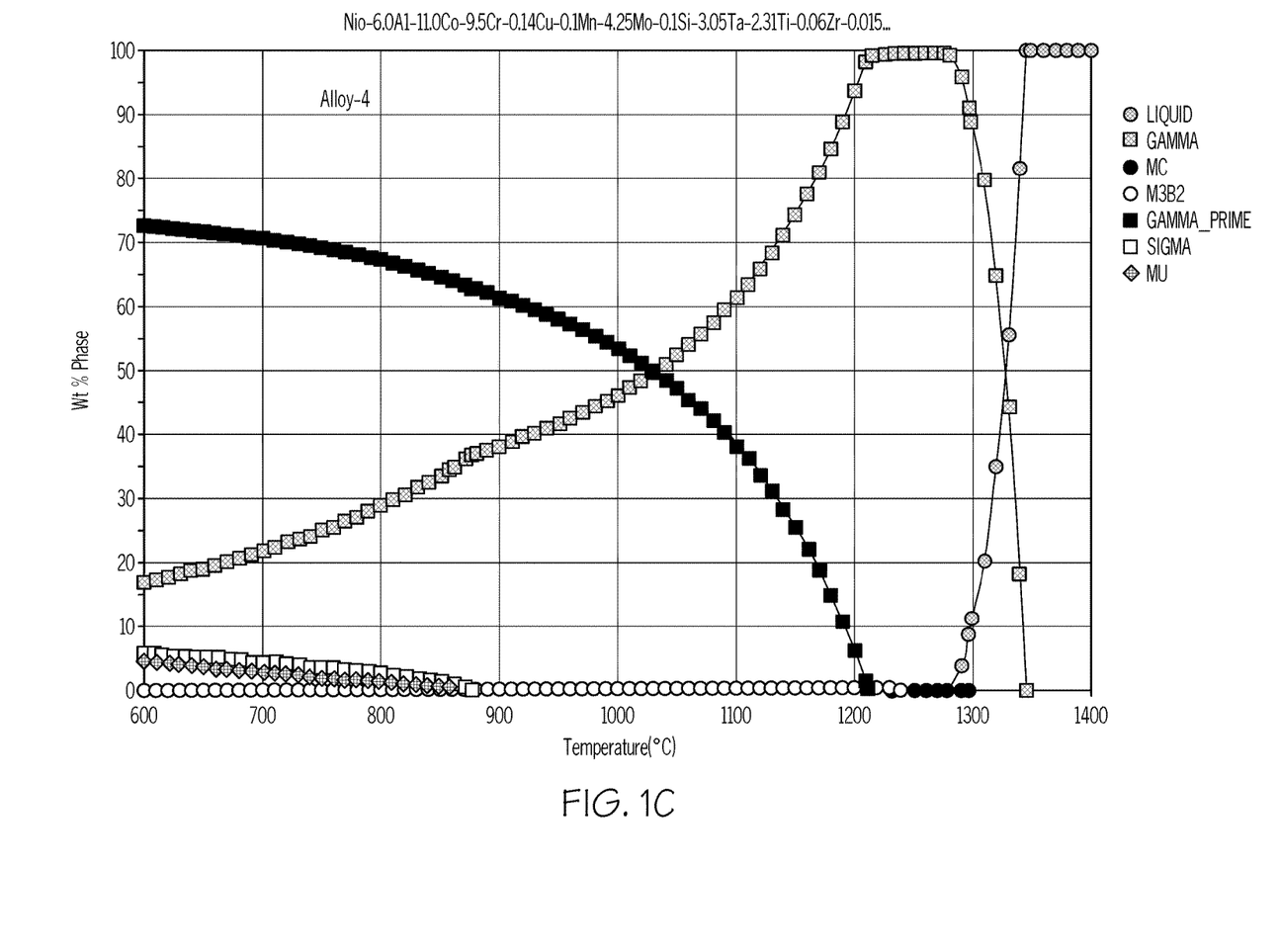

FIGS. 1A, 1B, and 1C are graphs that compare the material phases of the alloys (A) IN-713C, (B) Mar-M-246, and (C) the alloy of the present disclosure, respectively. As illustrated, the gamma and gamma prime phases of the alloy of the present disclosure (FIG. 1C) compare favorably with the prior art alloys across a wide range of temperatures.

Figure 2A:
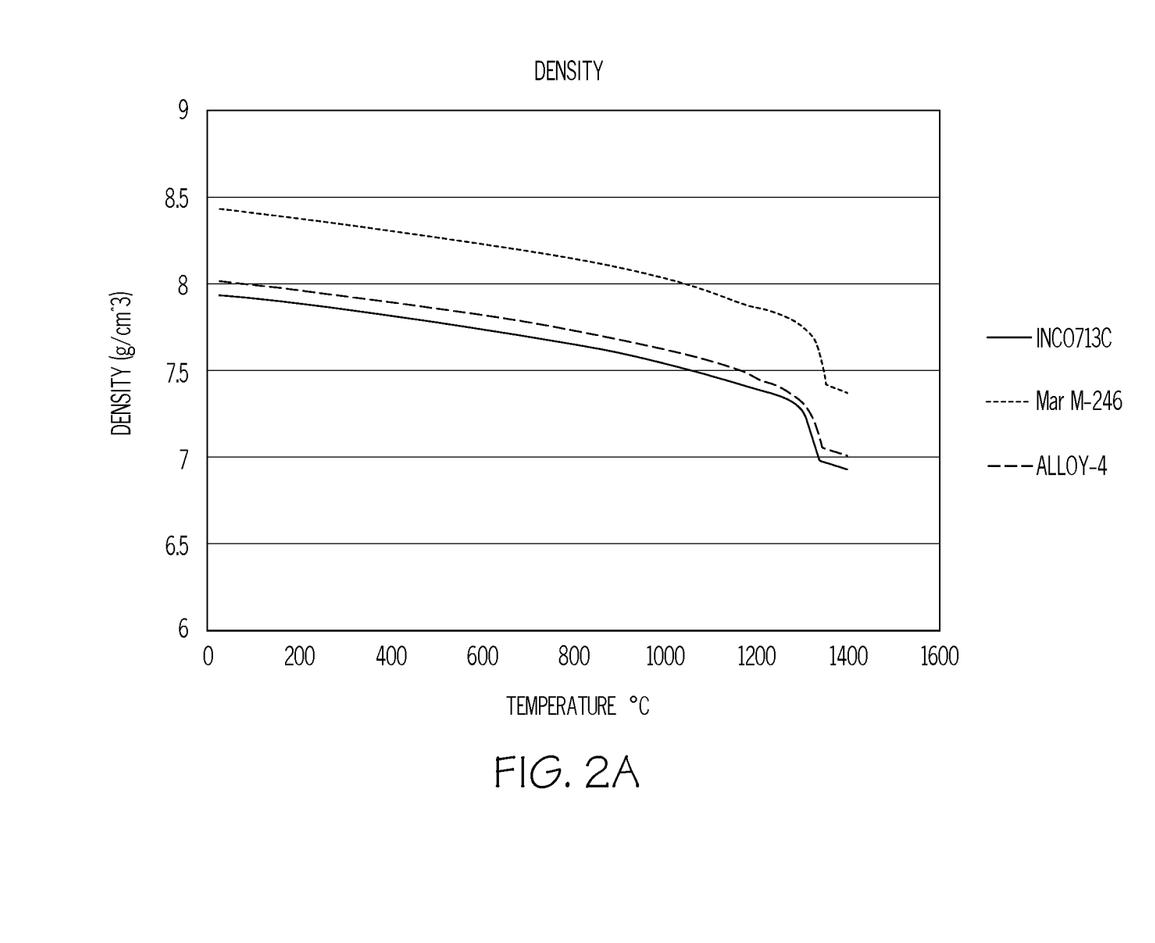
FIGS. 2A, 2B, and 2C are graphs that compare the (A) density, (B) coefficient of thermal expansion, and (C) thermal conductivity of the alloys IN-713C, Mar-M-246, and the alloy of the present disclosure, respectively.
Figure 2B:
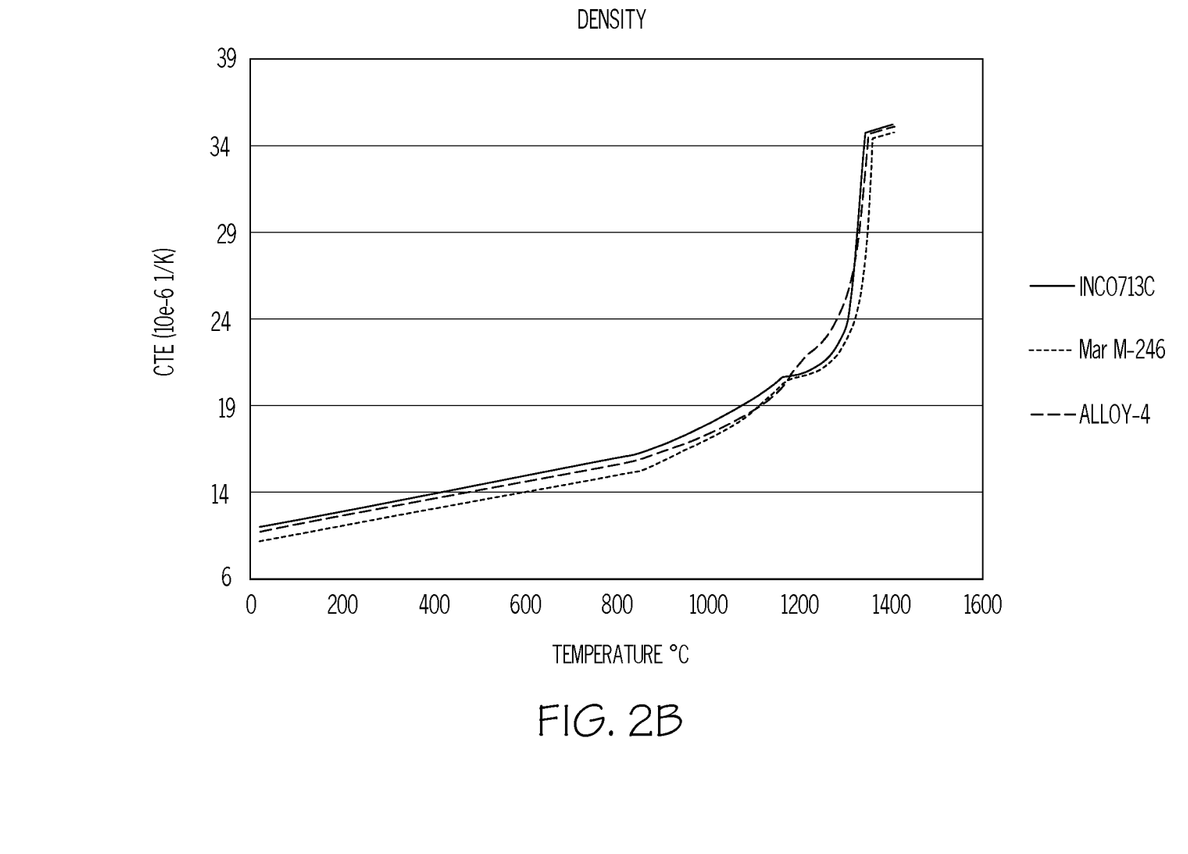
Figure 2C:
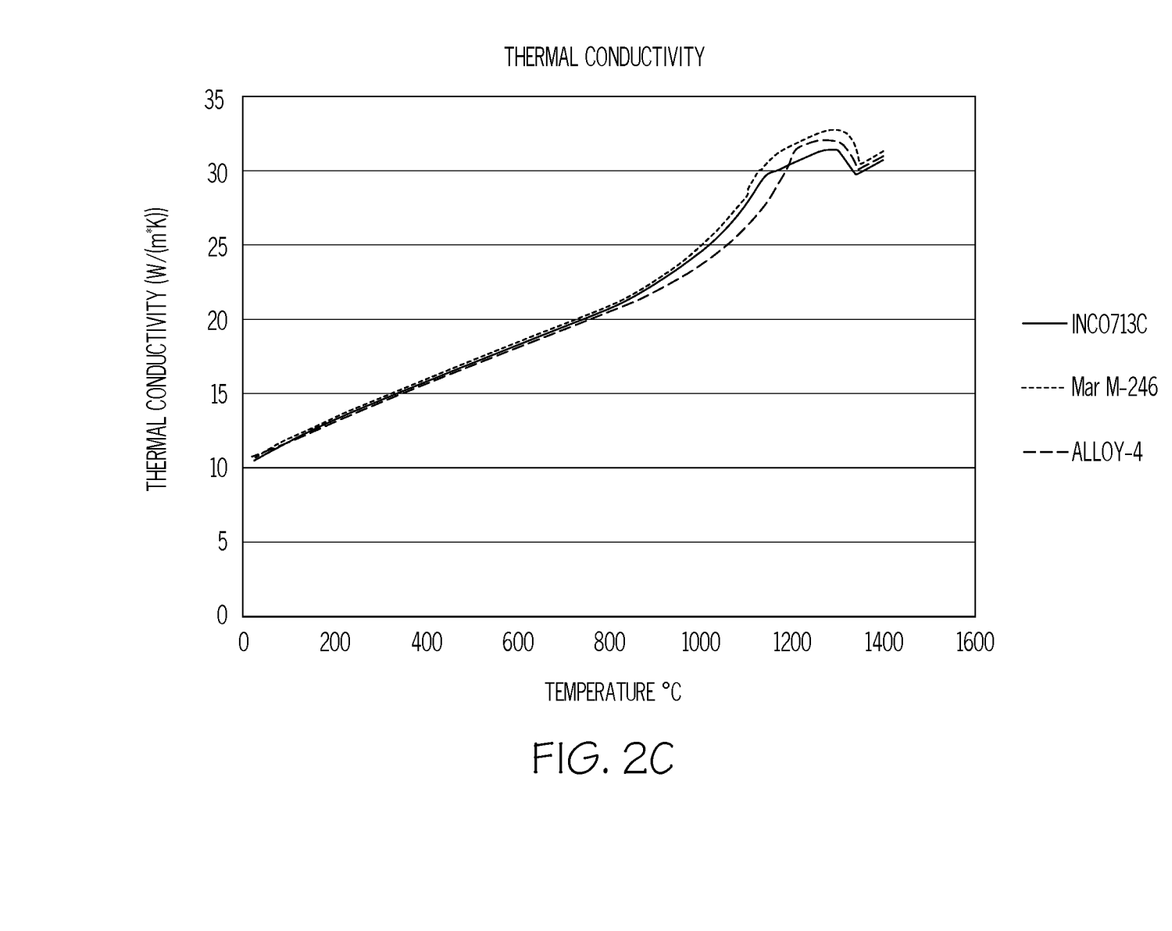

FIGS. 2A, 2B, and 2C are graphs that compare the (A) density, (B) coefficient of thermal expansion, and (C) thermal conductivity of the alloys IN-713C, Mar-M-246, and the alloy of the present disclosure, respectively. Among other properties, higher thermal conductivity, lower coefficient of thermal expansion (CTE), lower density and higher mechanical properties are desirable for turbine wheel materials. As illustrated, the alloy of the present disclosure exhibited lower density and similar CTE and thermal conductivity in comparison with Mar-M-246.

Figure 3:
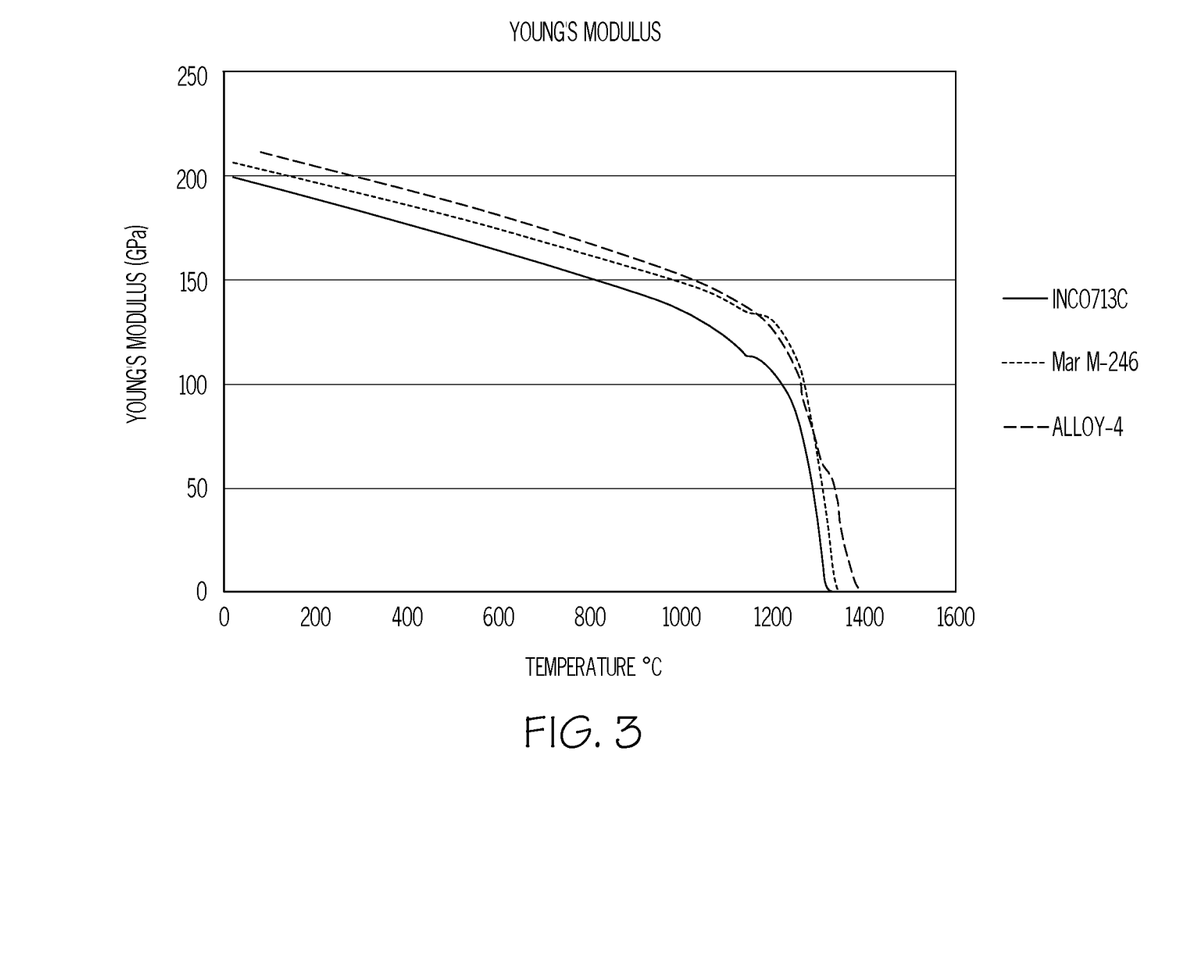
FIG. 3 is a graph that compares the Youngs' Modulus of the alloys IN-713C, Mar-M-246, and the alloy of the present disclosure.

FIG. 3 is a graph that compares the Youngs' Modulus of the alloys IN-713C, Mar-M-246, and the alloy of the present disclosure. As illustrated, the alloy in accordance with the present disclosure exhibits an improved Modulus up to about 1050° C., in comparison with the prior art alloys.

As such, described herein are embodiments of improved nickel-based alloys and turbocharger turbine wheels made with such nickel-based alloys. The described embodiments provide a high-temperature oxidation and fatigue-resistant nickel-based alloy that is achieved, in part, with increased in molybdenum, chromium, tantalum, and titanium, with no tungsten, in comparison to Mar-M-246. The resultant alloy has a reduced cost, wherein the raw material is about 30% less than Mar-M-246. Thus, the inventive alloy described herein will have a better dwell-fatigue resistance and better oxidation resistance with lesser cost, and will be a suitable alternative to the prior art options. As such, the alloy of the present disclosure can be used to make turbine wheels for applications reaching temperatures of 980° C. (constant) and 1020° C. (peak) with lower cost than existing commercial alloys.

All of the nickel-based alloys described herein may be understood as either: (1) "comprising" the listed elements in their various percentages, in an open-ended context or (2) "consisting of" the listed elements in their various percentages, in a closed-ended context. Alternatively, the alloys described herein may be understood as (3) "consisting essentially of" the listed elements in their various percentages, wherein other elements may be present in amounts not effecting the novel/nonobvious characteristics of the alloy. Thus, as used herein, the terms "comprising," "consisting of," and "consisting essentially of" should be understood as applicable to all of the ranges of alloy compositions disclosed herein.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

What is claimed is:

1. A turbocharger turbine wheel comprising, at least as a part of its overall composition, a nickel-based alloy, wherein the nickel-based alloy comprises, on a weight basis of the overall alloy:
   about 10.5% to about 11.5% cobalt;
   about 9.0% to about 10.0% chromium;
   about 5.75% to about 6.25% aluminum;
   about 2.8% to about 3.3% tantalum;
   about 4.0% to about 4.5% molybdenum;
   about 2.2% to about 2.4% titanium;
   about 0.13% to about 0.15% carbon;
   about 0.03% to about 0.09% zirconium; and
   a majority of nickel, with the proviso that tungsten is not included beyond impurity levels.

2. The turbocharger turbine wheel of claim 1, wherein the nickel-based alloy comprises cobalt in an amount of about 11.7% to about 11.3%.

3. The turbocharger turbine wheel of claim 1, wherein the nickel-based alloy comprises chromium in an amount of about 9.2% to about 9.8%.

4. The turbocharger turbine wheel of claim 1, wherein the nickel-based alloy comprises aluminum in an amount of about 5.9% to about 6.1%.

5. The turbocharger turbine wheel of claim 1, wherein the nickel-based alloy comprises tantalum in an amount of about 2.9% to about 3.2%.

6. The turbocharger turbine wheel of claim 1, wherein the nickel-based alloy comprises molybdenum in an amount of about 4.1% to about 4.4%.

7. The turbocharger turbine wheel of claim 1, wherein the nickel-based alloy comprises titanium in an amount of about 2.25% to about 2.35%.

8. The turbocharger turbine wheel of claim 1, wherein the turbocharger turbine wheel is configured for operation at a temperature range of about 980° C. to about 1020° C.

9. The turbocharger turbine wheel of claim 1, wherein the turbocharger turbine wheel is configured for operation at a temperature range of about 980° C. to about 1020° C.

10. A turbocharger turbine wheel comprising, at least as a part of its overall composition, a nickel-based alloy, wherein the nickel-based alloy consists of, on a weight basis of the overall alloy:
    about 10.5% to about 11.5% cobalt;
    about 9.0% to about 10.0% chromium;
    about 5.75% to about 6.25% aluminum;
    about 2.8% to about 3.3% tantalum;
    about 4.0% to about 4.5% molybdenum;
    about 2.2% to about 2.4% titanium;
    about 0.13% to about 0.15% carbon;
    about 0.03% to about 0.09% zirconium; and
    silicon in an amount of less than about 0.2%;
    boron in an amount of less than about 0.02%;
    manganese in an amount of less than about 0.2%;
    sulfur in an amount of less than about 0.015%; and
    a majority of nickel, with the proviso that inevitable/unavoidable impurities may be present in trace amounts.

11. The turbocharger turbine wheel of claim 10, wherein the nickel-based alloy consists of cobalt in an amount of about 11.7% to about 11.3%.

12. The turbocharger turbine wheel of claim 10, wherein the nickel-based alloy consists of chromium in an amount of about 9.2% to about 9.8%.

13. The turbocharger turbine wheel of claim 10, wherein the nickel-based alloy consists of aluminum in an amount of about 5.9% to about 6.1%.

14. The turbocharger turbine wheel of claim 10, wherein the nickel-based alloy consists of tantalum in an amount of about 2.9% to about 3.2%.

15. The turbocharger turbine wheel of claim 10, wherein the nickel-based alloy consists of molybdenum in an amount of about 4.1% to about 4.4%.

16. The turbocharger turbine wheel of claim 10, wherein the nickel-based alloy consists of titanium in an amount of about 2.25% to about 2.35%.

17. A turbocharger turbine wheel comprising, at least as a part of its overall composition, a nickel-based alloy consisting of, on a weight basis of the overall alloy:
    about 10.7% to about 11.3% cobalt;
    about 9.2% to about 9.8% chromium;
    about 5.9% to about 6.1% aluminum;
    about 2.9% to about 3.2% tantalum;
    about 4.1% to about 4.4% molybdenum;
    about 2.25% to about 2.35% titanium;
    about 0.13% to about 0.15% carbon;
    about 0.03% to about 0.09% zirconium;
    silicon in an amount of less than about 0.2%;
    boron in an amount of less than about 0.02%;
    manganese in an amount of less than about 0.2%;
    sulfur in an amount of less than about 0.015%; and
    a majority of nickel, with the proviso that inevitable/unavoidable impurities may be present in trace amounts.

18. The turbocharger turbine wheel of claim 17, wherein the turbocharger turbine wheel is configured for operation at a temperature range of about 980° C. to about 1020° C.

* * * * *

UNITED STATES PATENT AND TRADEMARK OFFICE
CERTIFICATE OF CORRECTION

PATENT NO. : 10,344,357 B1
APPLICATION NO. : 16/136597
DATED : July 9, 2019
INVENTOR(S) : Prashanth Chimangala Seetharamrao et al.

Page 1 of 1

It is certified that error appears in the above-identified patent and that said Letters Patent is hereby corrected as shown below:

On the Title Page

Item (54) and in the Specification, Column 1, Line 1, in the Title replace the word "INCORPORTATING" with "INCORPORATING"

Signed and Sealed this
Fifteenth Day of October, 2019

Andrei Iancu
*Director of the United States Patent and Trademark Office*